June 15, 1954 R. A. GIERLICH 2,680,911
GAUGE BLOCK HOLDER
Filed April 30, 1952 2 Sheets-Sheet 2
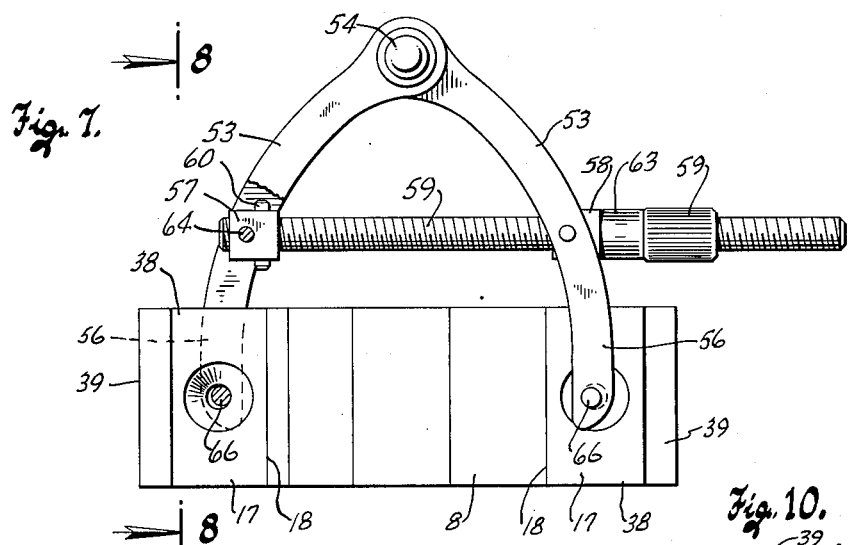
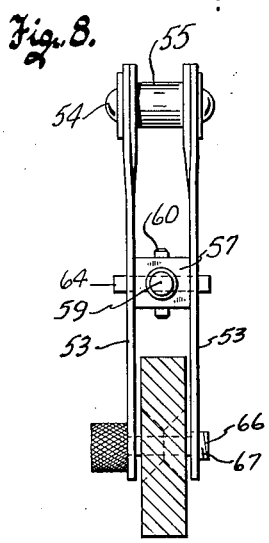
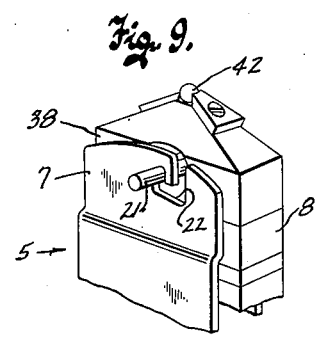
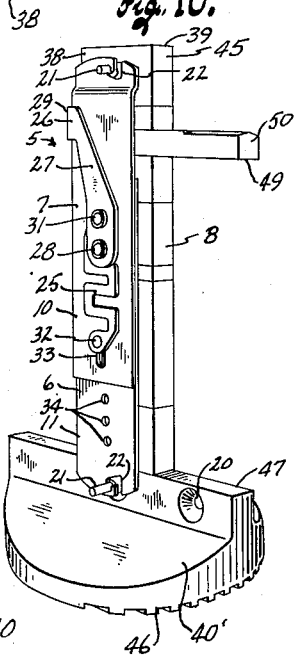
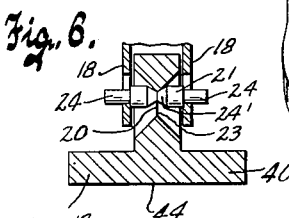
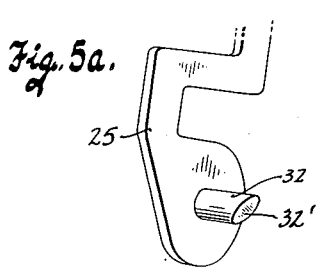
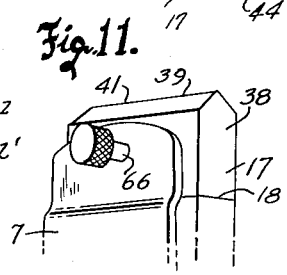
Inventor
Raymond A. Gierlich
By
Attorney Patented June 15, 1954

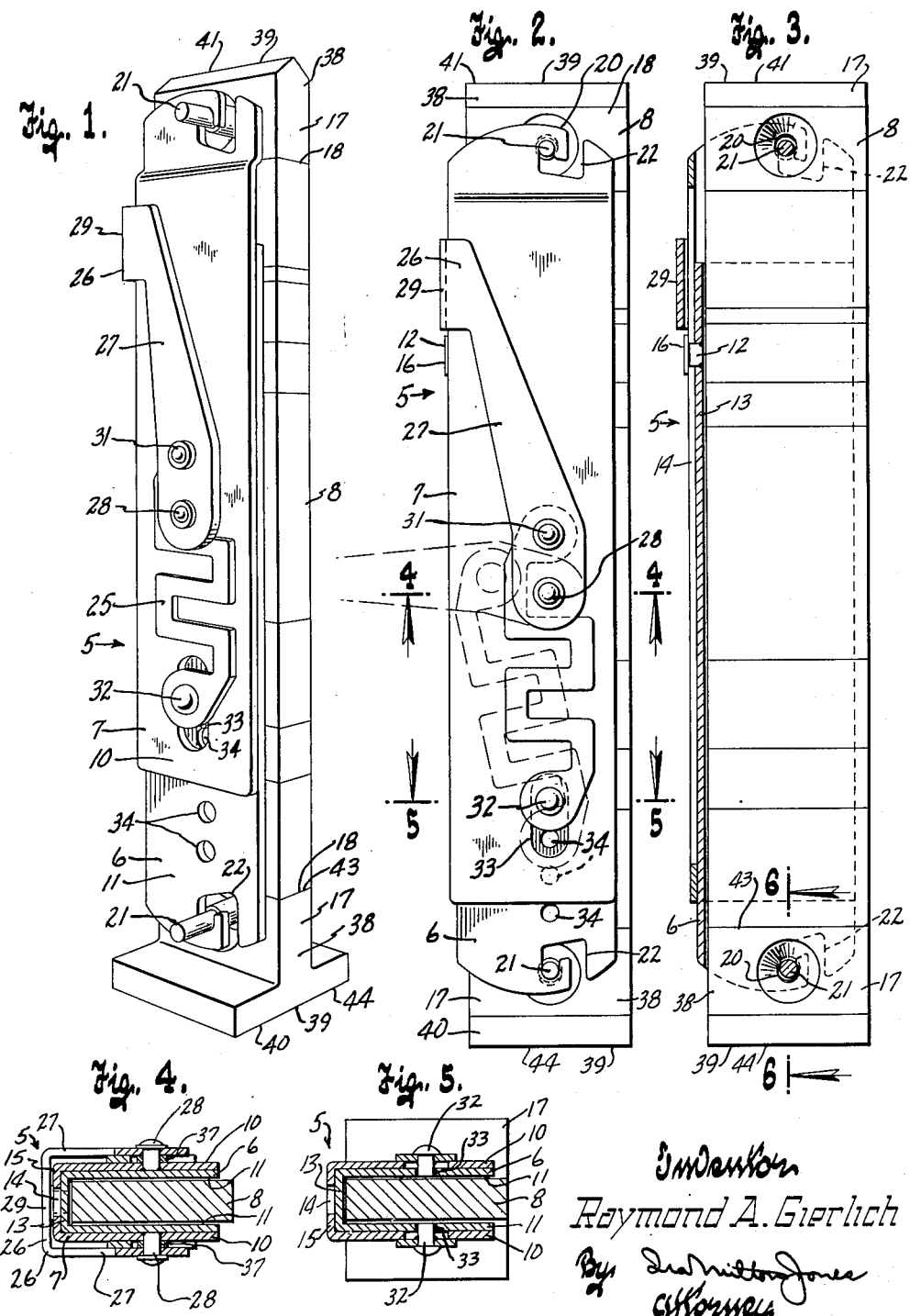

2,680,911

UNITED STATES PATENT OFFICE 2,680,911

GAUGE BLOCK HOLDER

Raymond A. Gierlich, Jordan, Minn., assignor to Continental Machines, Inc., Savage, Minn., a corporation of Minnesota Application April 30, 1952, Serial No. 285,349

13 Claims. (Cl. 33—168)

This invention relates to gaging instruments and refers more particularly to a holder for gage blocks or for gage blocks combined with other gaging units to form a gaging instrument.

Heretofore gage block holders for use with a stack of wrung-together gage blocks have been generally channel shaped, with closed ends, and the gaging units have been received between the flanges of the channel and clamped into the holder by means of a screw threaded through one closed end of the holder to urge the stack against the other closed end. Because the ends of the channel were closed, the gaging surfaces of the endmost blocks of the stack were inaccessible, and it was therefore necessary to use elongated gaging units which projected laterally outwardly beyond the channel flanges for contact with the work to be gaged.

A variety of these specialized elongated units had to be kept in stock to meet the varied requirements of gaging different types of work, and these had to include, in addition to such units as scriber and trammel points and gear measuring pins, a number of caliper bars and the like. Each of these special members was relatively costly, since its dimensions had to be held with the utmost precision along its entire length, and the large number of such specialized units required to be kept in a practical gaging set made such equipment all the more expensive.

By contrast, it is an object of this invention to provide a gaging instrument of the character described which will not necessitate the employment of gaging members of unusual shapes or sizes.

The provision of a gage block holder which will achieve the foregoing object is predicated upon a novel gaging member of this invention, and in this connection it is an object of this invention to provide an end piece for a gage block holder which will itself comprise a gage block or similar gaging unit and which may be wrung together with one or more standard gage blocks so as to be equally useful either in combination with a holder or as a gaging unit per se, for use outside a holder. Moreover, it is an important object of this invention to provide such a gaging member which may be produced at a cost which is only negligibly higher than the cost of an ordinary gage block.

A further object of this invention resides in the provision of a gaging instrument comprising a novel combination of gage block holder and gaging members whereby the foregoing objects may be attained by reason of the fact that gage blocks are clamped into the holder between gaging members having work engaging surfaces and which thus, in effect, form part of the holder while at the same time forming parts of the column of gage blocks to provide accurate spaced apart work engaging surfaces which are exposed at the ends of the holder.

Still another object of this invention resides in the provision of a novel gage block holder which differs markedly from the conventional channel shaped holder, more nearly resembling a curved leg caliper in appearance, and which will be more convenient to use for certain types of gaging work, and particularly in gaging inside dimensions.

A still further object of this invention resides in the provision of a gaging instrumentality of the character described wherein the entire stack of gage blocks and other gaging units held in the holder will have only point contact with the holder, so as to minimize transmission of heat from the hand of the user to the gage units, and thereby assure a high degree of gaging accuracy.

Another object of this invention resides in the provision of a gage block holder for holding a stack of wrung together gage blocks, wherein the gage blocks used with the holder will be clamped under a substantially uniform pressure, regardless of the size of the stack thereof, to thereby avoid any possibility of distortion of the blocks in consequence of the application of excessive clamping pressure to them, as was sometimes the case with screw clamps of the former type.

With the above and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawings illustrate several complete examples of the physical embodiments of the invention constructed in accordance with the best modes so far devised for the practical application of the principles thereof, and in which:

Figure 1 is a perspective view of a gage block holder embodying the principles of this invention and having a stack of wrung together gage blocks clamped therein and cooperating therewith to provide a gaging instrument;

Figure 2 is a side view of the Figure 1 gage block holder;

Figure 3 is a view similar to Figure 2, with one side of the holder broken away;

Figures 4 and 5 are cross sectional views taken, respectively, on the planes of the lines 4—4 and 5—5 in Figure 2;

Figure 5A is a fragmentary perspective view of the lower end of one of the clamping springs, viewing the same from the underside;

Figure 6 is a fragmentary sectional view taken on the plane of the line 6—6 in Figure 3;

Figure 7 is a side view of another type of gage block holder embodying the principles of this invention, portions being cut away to illustrate detail;

Figure 8 is a sectional view taken on the plane of the line 8—8 in Figure 7;

Figure 9 is a perspective view of a modified embodiment of the end piece gaging unit of this invention installed in one end of a holder of the type shown in Figure 1;

Figure 10 is a perspective view of another embodiment of the end piece of this invention, installed in a holder of the Figure 1 type; and Figure 11 is a fragmentary perspective view illustrating an alternate manner of connecting the end pieces to the channel-like jaw members of the Figure 1 type holder.

Referring now more particularly to the accompanying drawings, in which like numerals designate like parts throughout the several views, the numeral 5 designates generally a gage block holder embodying the principles of this invention and comprising an inner channel shaped member 6 and an outer channel shaped member 7 which cooperate to receive a stack of wrung together gage blocks 8.

As best seen in Figures 4 and 5, the flanges 10 of the outer channel are spaced apart a distance such as to embrace and guidingly engage the flanges 11 of the inner channel, and the flanges of the inner channel are spaced apart a distance substantially greater than the thickness of a standard gage block, so that when a wrung-together stack of gage blocks is secured in the holder, the flanges of the channel can be spaced from the side faces of the blocks and consequently the blocks will be insulated from any heat which might be conducted to the channel members from the hand of a user.

The two channel shaped members are secured together in nested relationship, that is, with their webs flatwise adjacent to one another, and in such a manner as to permit lengthwise telescoping adjustment of them. To this end a rivet 12 is secured, as by welding, to the web 13 of the inner channel and projects outwardly through a longitudinal slot 14 in the web 15 of the outer channel, with its head 16 overlying the outer channel adjacent to the side edges of the slot. The ends of the slot, of course, cooperate with the rivet 12 to define the limits of telescoping adjustment of the channels.

The gage blocks in the holder are held in place in the channels by being clamped between a pair of the novel gaging unit end pieces 17 of this invention, and these end pieces have novel detachable connections with the channel members. Each end piece may take any of several forms, to be described hereafter, but it comprises in general a gaging unit having one flat face 18 adapted to engage the exposed gaging surface of the endmost gage block of a wrung-together stack thereof and it is characterized by a hole 20 extending transversely therethrough. The end piece is secured to the channel by means of a loosely fitting pin 21 which extends through the hole 20 in the end piece and is hooked into reentrant slots 22 in the flanges of the channel at the remote ends thereof. Because of their adjustability toward and from one another, the remote ends of the channels which carry these pins 21 may be regarded as clamp jaws.

As best seen in Figure 6 the hole 20 in the end piece diverges outwardly in both directions from the medial plane of the end piece block, thereby defining an annular knife edge 23 on this medial plane, and the diameter of the hole at this knife edge, its narrowest point, is substantially larger than that of the pin 21 so that the end piece rests on the pin (and is thus carried by the channel member) with only a point contact. It will be seen that this connection between the end piece and the channel member leaves the end piece free for substantially universal swiveling motion; but in using the holder the flat faces 18 of the end pieces are securely clamped into flatwise engagement with the exposed gaging faces at the ends of a wrung together stack of gage blocks in the holder, and consequently when the holder is in use the end pieces are held in perfect alignment and restrained against all motion by the gage block surfaces against which they are clamped. Preferably the hole 20 is centered along the length of the end piece block to equalize the clamping forces thereon and insure against its turning on the pin, and the pins 21 are so held in their reentrant slots that the stacked blocks in the holder are held with their inner end faces spaced from the web 13 of the inner channel member. To space the end pieces and gage blocks from the flanges of the channel, the pins have reduced end portions 24, defining shoulders which engage the inner faces of the flanges of the channels, to thereby center the pins longitudinally, and each pin also has a V-shaped circumferential groove 24' at its longitudinal center, which cooperates with the annular knife edge 23 in an end piece held thereon to center the end piece between the channel flanges. The end pieces and gage blocks are thus completely spaced from the channel walls, so that heat imparted to the holder from the hand of a user will not affect the dimensional accuracy of the stack of gage blocks in the holder.

Clamping of the gage blocks into the holder is effected by means of a pair of tension springs 25 and a toggle lever 26 which cooperate with the channel members to bias their remote ends, or jaws, toward one another. The toggle lever is substantially U-shaped, embracing the outer channel member and comprising a pair of identical arms 27, each trunnioned at one end, as by a rivet 28, to a flange of the outer channel member. A cross member 29 connects the arms at their free opposite ends to define the bight of the U. The pivotal securements of the two arms of the toggle lever are of course coaxial.

The two tension springs 25 are preferably stamped or otherwise formed from resilient sheet material and have a zigzag shape. The upper end of each spring is pivotally secured, as at 31, to the medial portion of the toggle arm, while the lower end of each spring is secured to a rivet-like dog 32 which extends through a slot 33 in the flange of the outer channel shaped member and into any one of a series of longitudinally spaced holes 34 in the flange of the inner channel shaped member. As the toggle lever is swung downward to a position in which the cross member thereof is spaced from the web of the channel, as indicated by broken lines in Figure 2, tension on the spring is released so that the dogs 32 may be freely withdrawn from the adjusting holes 34 in the inner channel member, the springs, of course, being flexible laterally away from the faces of the flanges to permit such withdrawal. With the dogs out of the holes 34 the inner channel member may be telescopingly adjusted to a position substantially corresponding to the overall height of the stack of gage blocks to be secured therein, and the dogs are inserted into the holes 34 defining the nearest larger extension of the jaws of the holder which will accommodate the stack of gage blocks to be held therein.

When the gage blocks are inserted between the flanges of the channels, the end pieces being in place, the toggle lever is swung upwardly to bring its cross member into engagement with the web of the outer channel member, thus tensioning the springs to clamp the jaws of the holder together. When the cross member 29 of the toggle lever engages the web of the outer channel the toggle lever locks itself in this clamping position by reason of the fact that the points at which the springs are secured to the toggle arms are then carried slightly beyond a position of alignment with the pivot axis of the toggle lever and the dogs at the lower ends of the springs. Because the clamping pressure applied to the stack of gage blocks in the holder is exerted thereon by the tension springs 25, this pressure will not normally exceed a predetermined maximum value, equal to the tension which the springs exert when they are stretched the distance between the centers of adjacent adjusting holes 34 in the inner channel member. This maximum value is so chosen as to avoid the application to the gage blocks of excessive clamping pressure which might deform them sufficiently to cause them to give inaccurate readings.

Attention is directed to the fact that the zigzag configuration of each spring is such that its adjacent toggle arm substantially overlies the uppermost half loop thereof, in the locked position of the toggle lever, so that the arm clamps the spring between itself and the adjacent flange 10, restraining the spring against any tendency to move laterally, away from the face of the flange, and thus inhibiting disengagement of the dogs 32 from their adjusting holes 34. To accommodate the thickness of the springs, the trunnions 28 on which the toggle arms are mounted carry washer-like spacers 37, each about equal in thickness to the thickness of the spring and interposed between the arm and the channel flange adjacent to it.

Preferably the dogs 32 have their ends slabbed off at an angle, as at 32' (see Figure 5A), to provide a downwardly facing cam surface cooperable with the edges of the adjusting holes 34 to disengage the dogs therefrom when the channels are telescoped together, to thereby facilitate motion of the jaws into clamping engagement with a stack of blocks.

Because of the novel construction of the end pieces of this invention, and because the channel members have open ends, the end pieces can project beyond the ends of the channel members, as at 38, and their exposed end faces 39 may be accurately finished to comprise gaging surfaces engageable with work to be checked. For this reason the flat inner surface 18 of each end piece, which engages the exposed gaging face of the endmost gage block of the stack, is also preferably finished to gage block accuracy; and it will be seen that when this is done the end piece is in itself useful as a gage unit which may be wrung to a stack of gage blocks (for use either in or out of a holder), the hole 20 therethrough in nowise impairing the utility of the end piece when it is used without a holder.

Moreover, the utility of the holder 5 of this invention is augmented by the fact that the end pieces of this invention may be made in a variety of types. For example, end pieces may be made similar to conventional caliper bars, with their work engaging surfaces having a knife edge, as at 41 (see Figure 1), or they may be provided with a hardened point contactor 42 (see Figure 9), such as a sapphire or other jewel. Again, the end piece may be made substantially T-shaped, as at 40, for insertion into one end of the holder with the cross-bar of the T outermost, so that the end piece serves as a stable base for the holder, enabling the instrument to be used as a height gage. In that event the end piece will be provided with accurate gaging surfaces on the base 43 of the stem of the T (see Figure 6) and on the wide face 44 of the cross-bar of the T.

The end pieces of this invention are also readily adaptable for use with the elongated gaging units heretofore employed with gage block holders, serving, in such cases, merely as clamping members, as exemplified by the end piece 45 in Figure 10. End pieces used for that purpose, of course, need not be finished with gage block accuracy. A base member embodying the principles of this invention and useful with an elongated caliper type gaging unit is illustrated in Figure 10, wherein the lower end piece 40' is T-shaped in cross section and has an enlarged base 46. Its upper face 47 (the end of the stem of the T) is elongated so as to project laterally beyond the flanges of the holder and is finished to gage block accuracy so as to cooperate with an opposed gaging surface 49 on an elongated gaging unit 50 clamped into the holder near its upper end. Preferably the lower surface of the end piece 40' is also accurately finished. This form of base member is made relatively large, so as to provide a more stable base for the holder, and is provided with a pair of spaced apart holes 20 along the stem of the T so that it can be secured to the holder either near its center, to provide stability in all directions, or at one end, to cooperate with an elongated caliper bar in the manner illustrated. By mounting the holder on the base member 40' with the pin through the hole 20 nearer the end of the holder and with the stem portion of the holder projecting laterally from the back of the channel, the instrument may be used with a scriber, or the like, for operations in which the body of the holder must be brought close up to the work.

In some types of gaging work, and particularly in gaging inside diameters, the type of gage block holder shown in Figures 7 and 8, which resembles a pair of curved leg calipers, may be more convenient than the channel shaped type of holder described above. This embodiment of the holder of this invention comprises duplicate pairs of legs 53, pivotally secured together at their upper ends, as by a rivet 54, the two pairs of legs being held spaced apart by a spacer 55 on the rivet to provide bifurcated jaws 56 in which end pieces 17 of this invention may be received. The legs of each pair are further held spaced from those of the other pair by blocks 57 and 58 connected across the pairs of legs at the medial portions and which carry a clamping screw 59. One end of the clamping screw is nonrotatably secured in one of these blocks 57, as by means of a pin 60 passing through the screw and the block, and the other block 58 has a loosely fitting hole so as to be slidable along the screw as the jaws are opened and closed. A nut 62 on the screw, reacting, through a sleeve-like washer 63, against the spacer block 58, enables the application of clamping pressure to the jaws. To accommodate the swinging movement of the legs, the blocks 57 and 58 are pivotally mounted on the legs, as by means of pins 64.

The same types of end pieces may be used with the Figure 7 embodiment of the holder of this invention as are employed with the Figure 1 version, and they may be held in place by means of pins 66 carried by the bifurcations of each jaw. Instead of being held in a closely fitting slot, however, each of these pins may comprise a screw having its threaded end portion 67 (see Figure 8) received in a threaded hole in the jaw, its medial portion 69 being unthreaded to accommodate the end pieces. Alternatively, these pins may be made with plain ends, fitting relatively loosely in the holes in the jaws and having, like the pins 21 described in connection with the Figure 1 embodiment, a V-shaped circumferential groove around their medial portions in which the knife edge of the end piece centers itself, the pins thus being kept in place, prior to the tightening of the jaws, by cooperation between the sides of the end pieces and the bifurcations of the jaw. Obviously, a threaded pin, utilizing the arrangement shown in Figure 8, may be employed in the Figure 1 type of holder, either with or without a V-shaped circumferential groove at its center. Such an alternate construction is shown in Figure 11.

From the foregoing description, taken together with the accompanying drawings, it will be readily apparent that this invention provides a novel gaging instrument, comprising a gage block holder in combination with gaging end pieces, and that the elongated gaging units heretofore needed with gage block holders are not required with the instrument of this invention, the end pieces, which serve to clamp the gage blocks in place, being also gaging members.

What I claim as my invention is:

1. A gage block holder, comprising: means defining a pair of jaws adapted to span a stack of wrung-together gage blocks; means connecting said jaws for relative movement toward and from one another to provide for adjustment of their span; a pair of end pieces each having opposite surfaces thereon, one of said surfaces on each end piece being flat and adapted to be wrung to a gage block, and the other of said surfaces being adapted to be engaged with work to be gaged; connections between the end pieces and said jaws disposing the end pieces with said flat surfaces thereof opposing one another and their other surfaces facing in opposite directions and lying beyond the extremities of said jaws, said connections constraining the end pieces to move toward one another with the jaws but allowing the end pieces to rock with respect to the jaws to thereby enable the end pieces to orient themselves to the end surfaces of a stack of gage blocks confined between the end pieces; and means connected between said jaws for drawing the jaws and hence the end pieces toward one another into clamping relationship with respect to a stack of wrung-together gage blocks disposed between the opposing flat surfaces of the end pieces.

2. The gaging device of claim 1, further characterized by the fact that each of said jaws is bifurcated to embrace the opposite sides of the end piece connected therewith, and the connection between the jaw and the end piece comprises a pin carried by the bifurcations of the jaw and extending through a loosely fitting hole in the end piece extending through the end piece from one of said sides thereof to the other, and diverging outwardly in both directions, with its smallest diameter on the medial plane of the end piece.

3. A gaging device for use with a stack of wrung-together gage blocks, comprising a pair of gaging members each having a pair of opposite gaging surfaces, one of which is a flat surface adapted to be wrung to an exposed gaging surface of a gage block and the other of which is adapted to be engaged with an object to be gaged, said gaging member being characterized by a transverse hole therethrough, the axis of which is parallel to the plane of said flat surface of the gaging member, said hole being tapered inwardly from each of its mouths to define substantially an annular knife edge on the medial plane of the gaging member; a pin fitting loosely in the hole of each of said gaging members; jaws to which the pins are secured; means connecting the jaws for relative movement toward and from one another, said connecting means holding the jaws with their pins at all times substantially parallel to one another; and means for drawing the jaws together to thereby enable clamping a stack of wrung-together gage blocks between the flat surfaces of the pair of gaging members.

4. A gage block holder comprising: a pair of channel shaped members, one having its flanges spaced apart a distance greater than the thickness of a gage block and the other having its flanges spaced apart a distance sufficient to enable the first to be snugly but slidably nested therein; a pin detachably secured at one end of each of said channel shaped members, spanning the space between the flanges thereof substantially perpendicular thereto; means connecting said channel shaped members and constraining them to telescoping adjustment with their web portions adjacent and parallel to one another and with their pin-holding ends remote from one another; a pair of gaging end pieces, each received between the flanges of a channel shaped member at the pin-holding end thereof and having a flat gaging surface adapted to be wrung to one gaging surface of a gage block and another gaging surface adapted to engage work to be gaged, each of said end pieces having a transverse hole through which the adjacent pin passes with a loose fit to provide a swivel joint connection between the end piece and the channel shaped member to which it is connected; and means drawing the pin-holding ends of said channel members toward one another so that the end pieces carried thereby can clampingly engage a wrung-together stack of gage blocks with said flat surfaces of the end pieces in intimate contact with the exposed gaging surfaces of said stack of gage blocks and with said stack of gage blocks accurately establishing the distance between the work-engaging gaging surfaces of said end pieces and steadying the end pieces against swiveling motion on the pins.

5. The gage block holder of claim 4 wherein each of said pins has a substantially V-shaped circumferential groove in its portion passing through the adjacent end piece, and each end piece has a knife edge in the pin receiving hole thereof which has point engagement with the bottom of the V-shaped groove in its adjacent pin; further characterized by connections between the pins and channel flanges precluding axial shifting of the pins relative to the holder and holding the V-shaped grooves medially between the flanges of the channels so that the end pieces and gage blocks clamped therebetween may be held by said knife edges in spaced relation to the channel flanges; and wherein said pins are so located with respect to the channel webs as to hold the edges of the end pieces and gage blocks adjacent to said webs spaced therefrom, whereby the entire stack of gage blocks in the holder will be separated from the adjacent surfaces of the holder by a heat insulating air space.

6. A gage block holder comprising: a pair of channel shaped members, one having its flanges spaced apart a distance sufficient to receive the narrow dimension of a gage block and the other having its flanges spaced apart a distance sufficient to enable the first to be snugly but slidably nested therein; a pin detachably secured in the flanges at one end of each of said channel shaped members, spanning the space between the flanges thereof substantially perpendicular thereto; means connecting said channel shaped members and constraining them to telescoping adjustment with their web portions adjacent and parallel to one another and their pin-holding ends remote from one another; a pair of gaging end pieces, each received between the flanges of a channel shaped member at the pin-holding end thereof and having a flat gaging surface adapted to be wrung to one gaging surface of a gage block and another gaging surface adapted to engage work to be gaged, each of said end pieces having a transverse hole through which one of said pins passes with a loose fit to provide a swivel joint connection between the end piece and the channel shaped member to which it is connected; a tension spring; a dog connected with one end of said tension spring and engageable through an aperture in a flange of said second designated channel shaped member with any one of a plurality of longitudinally spaced holes in the adjacent flange of said first designated channel shaped member; and a toggle arm pivotally connected to said apertured flange of said second designated channel shaped member for swinging motion about an axis spaced from said aperture, the other end of said tension spring being connected to said arm at a point thereon spaced from said axis, so that swinging movement of said toggle arm in one direction exerts a telescoping force on the channel members, through the engagement of said dog in one of said longitudinally spaced holes and the tensioning of the spring connected between the dog and the arm, whereby the end pieces are maintained in clamping engagement with a stack of wrung-together gage blocks between their flat gaging surfaces, so that the distance between the work-engaging gaging surfaces of said end pieces is precisely determined by said stack of gage blocks.

7. A channel shaped holder for a stack of wrung-together gage blocks, characterized by the fact that said holder comprises a pair of elongated open-ended channels connected for telescoping adjustment; further characterized by a pair of end pieces at the remote ends of said channels each having a swivel connection to one of the channels; and further characterized by the fact that each of said end pieces has a work-engaging gaging surface which projects beyond the adjacent end of its channel and a flat gaging surface intimately engageable with the exposed gaging surface of one of a stack of wrung-together gage blocks to steady the end pieces on their swivel connections and accurately establish a gaging dimension between said work-engaging surfaces of the end pieces.

8. The gage block holder of claim 7, further characterized by the fact that each of said swivel connections between the channels and the end pieces comprises a pin readily detachably secured in the flanges of the channel and spanning the space between the same and passing through a loosely fitting transverse hole through the end piece.

9. The gage block holder of claim 7, further characterized by spring means connected between said telescoped channels to yieldingly bias their remote ends toward one another so that said end pieces will securely clamp a stack of wrung-together gage blocks interposed between them.

10. The gage block holder of claim 9, further characterized by the fact that said spring means comprises a tension spring connected at one end to one of said channels; and further characterized by cooperating means on the other end of the spring and the other of said channels interconnectable at any one of a number of longitudinally spaced apart locations on said other channel, so that the tension exerted by said tension spring may be made substantially constant, regardless of the relative position of telescoping adjustment of the channels.

11. In a device of the character described: means defining an elongated gage block holder having a substantially U-shaped cross section and having its opposite ends open; an end piece connected to said holder at each end thereof, between the legs of the U, to substantially close the ends of the holder, said end pieces projecting outwardly beyond the adjacent ends of the holder and having gaging surfaces on their outer extremities, and said end pieces having inner gaging surfaces opposing one another and intimately engageable with the gaging surfaces at the ends of a stack of wrung-together gage blocks received in the holder; and means on the holder for moving one of said end pieces toward the other so as to effect clamping engagement of the end pieces with the opposite ends of a stack of gage blocks in the holder.

12. The gage block holder of claim 7 further characterized by means connected between said telescoped channel for drawing their remote ends toward one another so that said end pieces will securely clamp a stack of wrung-together gage blocks interposed between them.

13. A gaging device for use with a stack of wrung-together gage blocks, comprising: a pair of jaw members, each having spaced apart parallel flanges; means connecting the jaw members for movement toward and from one another; an end piece for each jaw member having a portion thereof received between the flanges of its jaw member, said portion having a round hole transversely therethrough; said end pieces each having a flat face engageable with one end of a stack of wrung-together gage blocks and a work engaging face opposite its said flat face and disposed beyond the jaw member to be engageable with work to be gaged; a round pin removably mounted in each jaw member across the space between its flanges and extending through the hole in the adjacent end piece, said pin being smaller in diameter than the hole so that engagement of the surfaces of the pin and hole is possible only when the pin is eccentrically disposed in the hole, one of said surfaces having a substantially conical formation in cross section with the apex thereof facing the other surface so that engagement of said surfaces provides a swivel connection between the jaw member and its end piece; and means for drawing said jaw members together to thus enable their end pieces to clamp a stack of wrung-together gage blocks therebetween, the swivel connections allowing the end pieces to accommodate themselves to the ends of the stack.

References Cited in the file of this patent

UNITED STATES PATENTS

| Number | Name | Date |
|---|---|---|
| 635,088 | Bowker | Oct. 17, 1899 |
| 1,491,100 | Hoke | Apr. 22, 1924 |

FOREIGN PATENTS

| Number | Country | Date |
|---|---|---|
| 248,519 | Switzerland | May 15, 1947 |
| 119,002 | Sweden | July 29, 1947 |